US009158602B2

(12) United States Patent
Kumar et al.

(10) Patent No.: US 9,158,602 B2
(45) Date of Patent: *Oct. 13, 2015

(54) PROCESSING POSTED RECEIVE COMMANDS IN A PARALLEL COMPUTER

(75) Inventors: Sameer Kumar, White Plains, NY (US); Amith R. Mamidala, Yorktown Heights, NY (US); Joseph D. Ratterman, Seattle, WA (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/476,571

(22) Filed: May 21, 2012

(65) Prior Publication Data
US 2013/0312010 A1 Nov. 21, 2013

(51) Int. Cl.
*G06F 9/54* (2006.01)

(52) U.S. Cl.
CPC .......... *G06F 9/546* (2013.01); *G06F 2209/548* (2013.01)

(58) Field of Classification Search
CPC .......................... G06F 9/546; G06F 2209/548
See application file for complete search history.

(56) References Cited

U.S. PATENT DOCUMENTS

| 8,170,041 | B1* | 5/2012 | Underwood et al. ......... 370/412 |
| 2005/0078605 | A1* | 4/2005 | Huang et al. .................. 370/235 |
| 2010/0220589 | A1 | 9/2010 | Zheng et al. |
| 2010/0232448 | A1 | 9/2010 | Sugumar et al. |

OTHER PUBLICATIONS

Balaji, P., et al., "Enabling Concurrent Multithreaded MPI Communication on Multicore Petascale Systems", Proceedings of the 17th European MPI Users' Group Meeting Conference on Recent Advances in the Message Passing Interface, Sep. 12, 2010, pp. 1-9, Springer-Verlag, Stuttgart, Germany.
Office Action, U.S. Appl. No. 13/678,779, May 13, 2014, pp. 1-32.

* cited by examiner

*Primary Examiner* — H S Sough
*Assistant Examiner* — Syed Roni
(74) *Attorney, Agent, or Firm* — Edward J. Lenart; Grant A. Johnson; Kennedy Lenart Spraggins LLP

(57) ABSTRACT

Processing posted receive commands in a parallel computer, including: posting, by a parallel process of a compute node, a receive command, the receive command including a set of parameters excluding the receive command from being directed among parallel posted receive queues; flattening the parallel unexpected message queues into a single unexpected message queue; determining whether the posted receive command is satisfied by an entry in the single unexpected message queue; if the posted receive command is satisfied by an entry in the single unexpected message queue, processing the posted receive command; if the posted receive command is not satisfied by an entry in the single unexpected message queue: flattening the parallel posted receive queues into a single posted receive queue; and storing the posted receive command in the single posted receive queue.

12 Claims, 10 Drawing Sheets

PROCESSING POSTED RECEIVE COMMANDS IN A PARALLEL COMPUTER

BACKGROUND OF THE INVENTION

1. Field of the Invention

The field of the invention is data processing, or, more specifically, methods, apparatus, and products for processing posted receive commands in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Message passing among processes of a parallel application in a parallel computer provides challenges in optimization. When possible, parallelism in processing messages may provide some optimization in message passing. At times and for one or more reasons, however, parallelism cannot be utilized to process messages.

SUMMARY OF THE INVENTION

Methods, apparatus and products for processing posted receive commands in a parallel computer are disclosed in this specification. The parallel computer includes a plurality of compute nodes coupled for data communications by a data communications network, where each compute node executes one or more parallel processes and includes a plurality of parallel posted receive queues and a plurality of parallel unexpected message queues. Posted receive commands are directed to a particular posted receive queue in dependence upon a set of message parameters and unexpected messages are directed to a particular unexpected message queue in dependence upon the set of message parameters. Processing posted receive commands in such a parallel computer includes: posting, by a parallel process of a compute node, a receive command, the receive command including a set of parameters excluding the receive command from being directed among the parallel posted receive queues; flattening the parallel unexpected message queues into a single unexpected message queue; determining whether the posted receive command is satisfied by an entry in the single unexpected message queue; if the posted receive command is satisfied by an entry in the single unexpected message queue, processing the posted receive command; if the posted receive command is not satisfied by an entry in the single unexpected message queue: flattening the parallel posted receive queues into a single posted receive queue; and storing the posted receive command in the single posted receive queue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
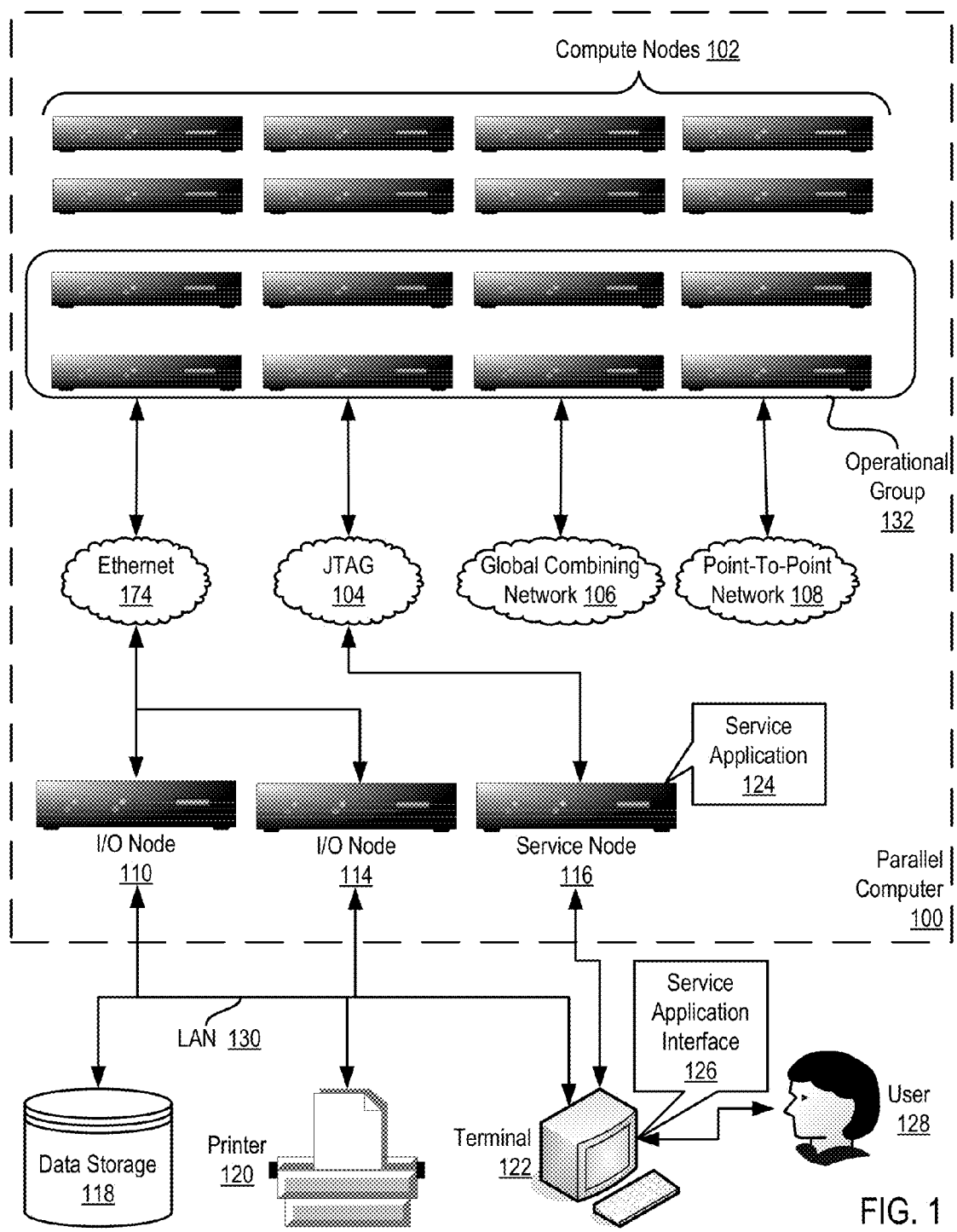
FIG. 1 illustrates an exemplary system for processing posted receive commands in a parallel computer according to embodiments of the present invention.

Exemplary methods, apparatus, and products for processing posted receive commands in a parallel computer in accordance with the present invention are described with reference to the accompanying drawings, beginning with FIG. 1. FIG. 1 illustrates an exemplary system for processing posted receive commands in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for processing posted receive commands in a parallel computer in accordance with embodiments of the present invention. Receive commands support message passing among parallel processes of a parallel application in a compute node. A parallel process issues a receive command with a set of parameters identifying a message to be received by the process. When a message arrives that matches the parameters of the posted receive command, a callback is issued to the process, indicating that the message has arrived. A receive command is processed in various ways in dependence upon the arrival time of the message that satisfies the receive command. If the message has not arrived at the time the receive command is issued, the receive command is posted into a queue. Upon the message's arrival, the receive command is removed from the queue and a callback to the parallel process is issued. If the message arrived prior to the posting of the receive command, the message is considered an 'unexpected message' and stored in an unexpected message queue. Then, when the receive command is issued, the unexpected message queue is examined and upon discover the message that satisfies the receive command, the callback is issued.

In the example of FIG. 1, each compute node (102) includes a plurality of parallel posted receive queues and a plurality of parallel unexpected message queues. The receive queues here are described as 'parallel' in that the queues may be processed in parallel. Posted receive commands are directed to a particular parallel posted receive queue in dependence upon a set of message parameters which may include a source identifier and a context identifier, among other possible parameters. A source identifier of a posted receive command identifies a source (or sender) of a message. A context identifier identifies a group for the source of a message. A message having a source identifier and context identifier that matches the source identifier and context identifier of a posted receive command, satisfies the posted receive command. In some embodiments, the source identifier and context identifier are integer values, such that a hash of these message parameters may be taken to direct the posted receive command to a particular parallel posted receive queue. In a similar manner, unexpected messages are directed to a particular parallel unexpected message queue in dependence upon the set of message parameters included in the message itself.

Processing posted receive commands in the example parallel computer (100) of FIG. 1 in accordance with embodiments of the present invention includes posting, by a parallel process of a compute node, a receive command, the receive command including a set of parameters excluding the receive command from being directed among the parallel posted receive queues. In some embodiments, a posted receive command may include a wildcard value for a source identifier. An example of such a wildcard value is an "ANYSOURCE" value. An ANYSOURCE value indicates that a message from any source, with a matching context identifier, satisfies the posted receive command. In embodiments in which non-wildcard source identifiers are integers and hash of the message parameters is used to direct a posted receive command to a particular parallel receive queue, a wildcard source identifier prohibits a hash to be taken of the parameters and the posted receive command cannot be directed to a parallel posted receive queues.

To that end, a message passing module administering message passing among the compute nodes, flattens the parallel unexpected message queues into a single unexpected message queue and determines whether the posted receive command is satisfied by an entry in the single unexpected message queue. If the posted receive command is satisfied by an entry in the single unexpected message queue, the message passing module processes the posted receive command (issuing a callback to the parallel process). If the posted receive command is not satisfied by an entry in the single unexpected message queue: the message passing module flattens the parallel posted receive queues into a single posted receive queue and stores the posted receive command in the single posted receive queue.

Processing posted receive commands according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of processing posted receive commands according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
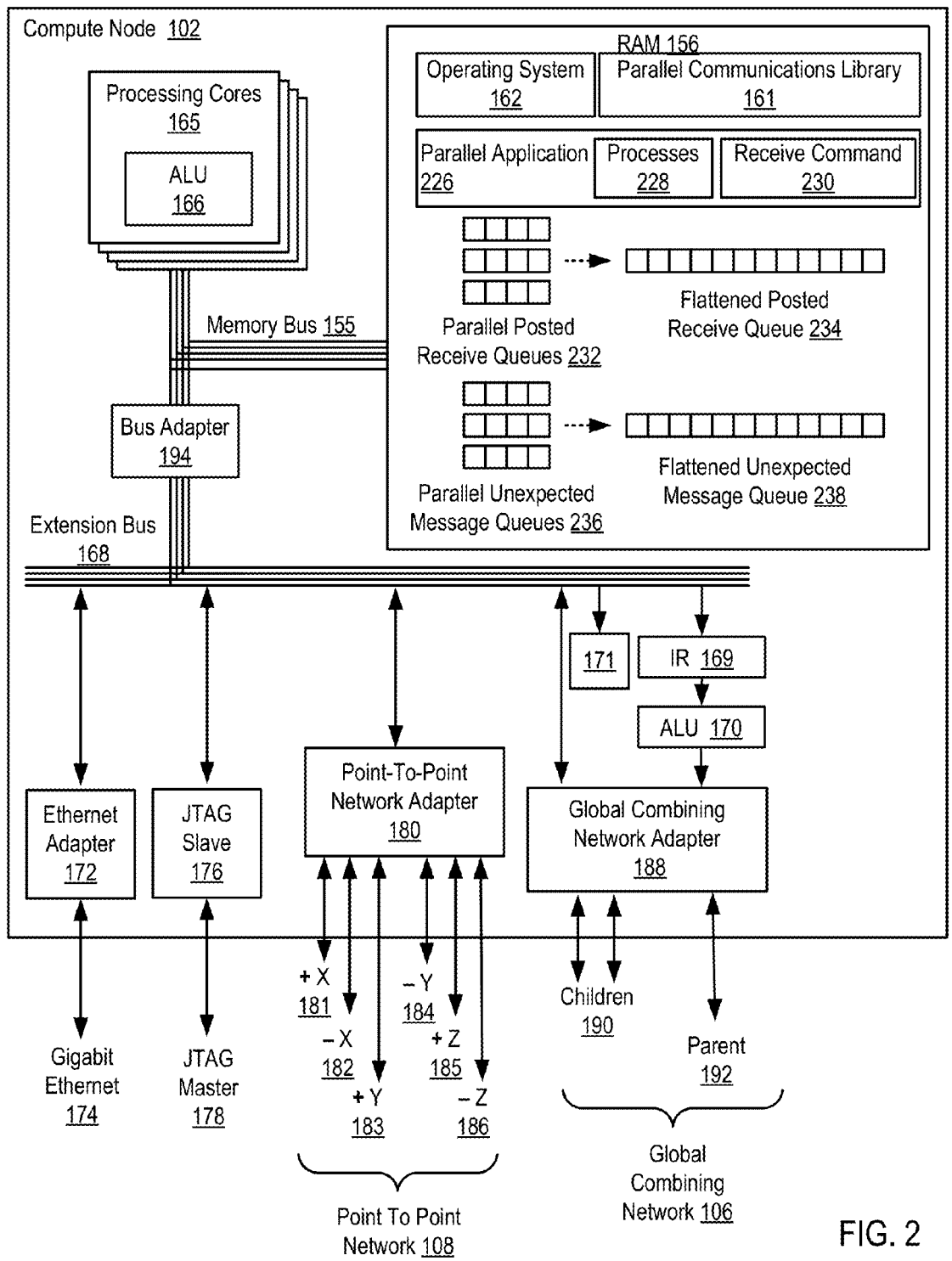
FIG. 2 sets forth a block diagram of an example compute node useful in a parallel computer capable of processing posted receive commands according to embodiments of the present invention.

In the example of FIG. 2, the parallel communications library (161) is also configured to process posted receive commands in accordance with embodiments of the present invention. In the example compute node (102) of FIG. 2, the parallel communications library (161) administers a plurality of parallel posted receive queues (232) and a plurality of parallel unexpected message queues (236) for use in message passing among parallel processes (228) of a parallel application (226). Posted receive commands (230) are directed to a particular parallel posted receive queue (232) in dependence upon a set of message parameters which may include a source identifier and a context identifier, among other possible parameters.

The parallel communications library (161) processes posted receive commands (230) in accordance with embodiments of the present invention responsive to a parallel process (228) posting a receive command (230), where the receive command (230) including a set of parameters excluding the receive command from being directed among the parallel posted receive queues.

The parallel communications library (161) then flattens the parallel unexpected message queues (236) into a single unexpected message queue (238) and determines whether the posted receive command is satisfied by an entry in the single unexpected message queue. The term 'flattening' as used in this specification refers to combining a set of parallel queues into a single queue. If the posted receive command (230) is satisfied by an entry in the single unexpected message queue, the parallel communications library (161) processes the posted receive command, issuing a callback to the parallel process (228) informing the process that a message is available. In some embodiments, if the posted receive command (230) is satisfied by an entry in the single unexpected message queue, the parallel communications library (161) may also split the single unexpected message queue (238) back into the parallel unexpected message queues (236)

If the posted receive command (230) is not satisfied by an entry in the single unexpected message queue (238): the parallel communications library (161) flattens the parallel posted receive queues (232) into a single posted receive queue (234) and stores the posted receive command (230) in the single posted receive queue (234). In some embodiments, when a message matching the parameters of the posted receive command (230) is received, the parallel communications library (161) splits the single posted receive queue (234) back into the parallel posted receive queues (232).

In this way, order amongst incoming messages and posted receive commands may be maintained, even when a posted receive command includes a wildcard value as a parameter precluding the posted receive command from being directed amongst the parallel posted receive queues.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG.

2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for processing posted receive commands include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for processing posted receive commands to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
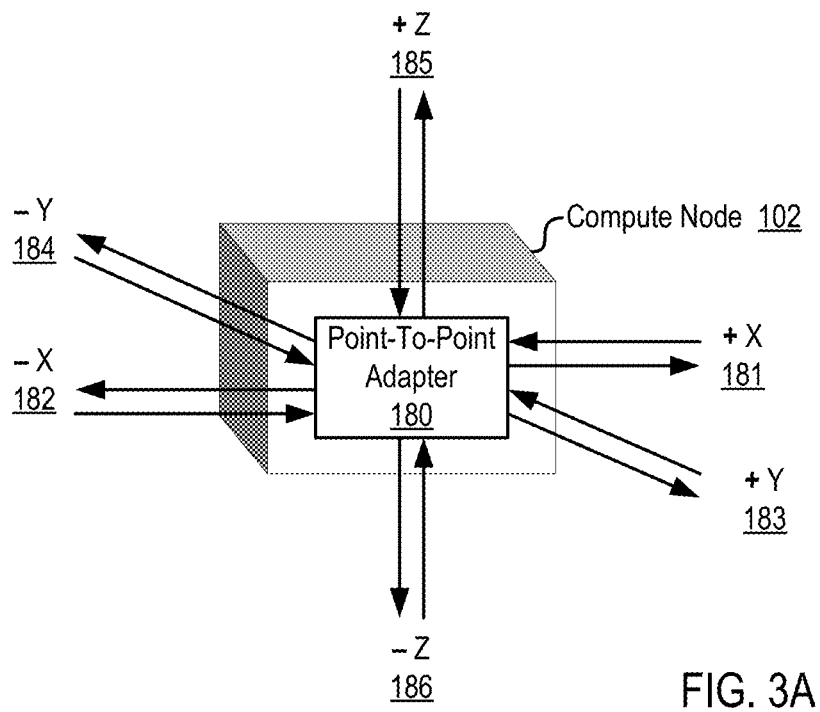
FIG. 3A sets forth a block diagram of an example Point-To-Point Adapter useful in systems for processing posted receive commands according to embodiments of the present invention.

For further explanation, FIG. 3A sets forth a block diagram of an example Point-To-Point Adapter (180) useful in systems for processing posted receive commands according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
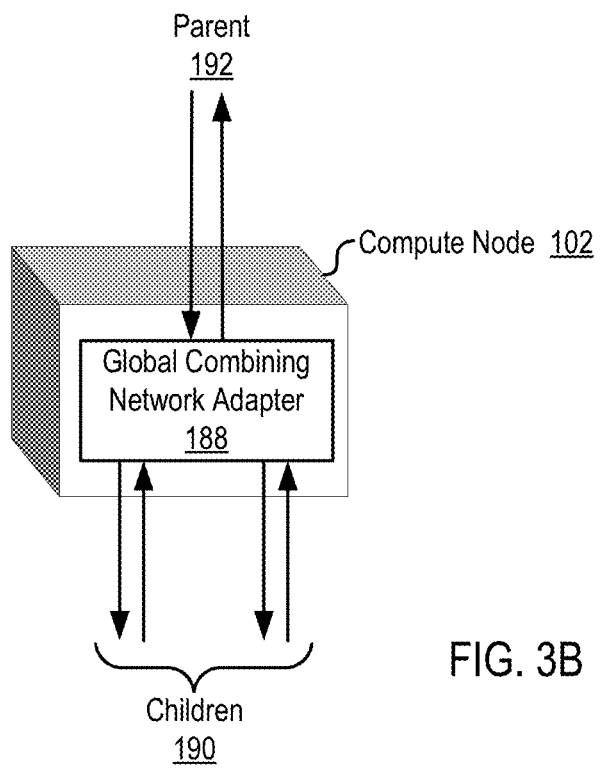
FIG. 3B sets forth a block diagram of an example Global Combining Network Adapter useful in systems for processing posted receive commands according to embodiments of the present invention.

For further explanation, FIG. 3B sets forth a block diagram of an example Global Combining Network Adapter (188) useful in systems for processing posted receive commands according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
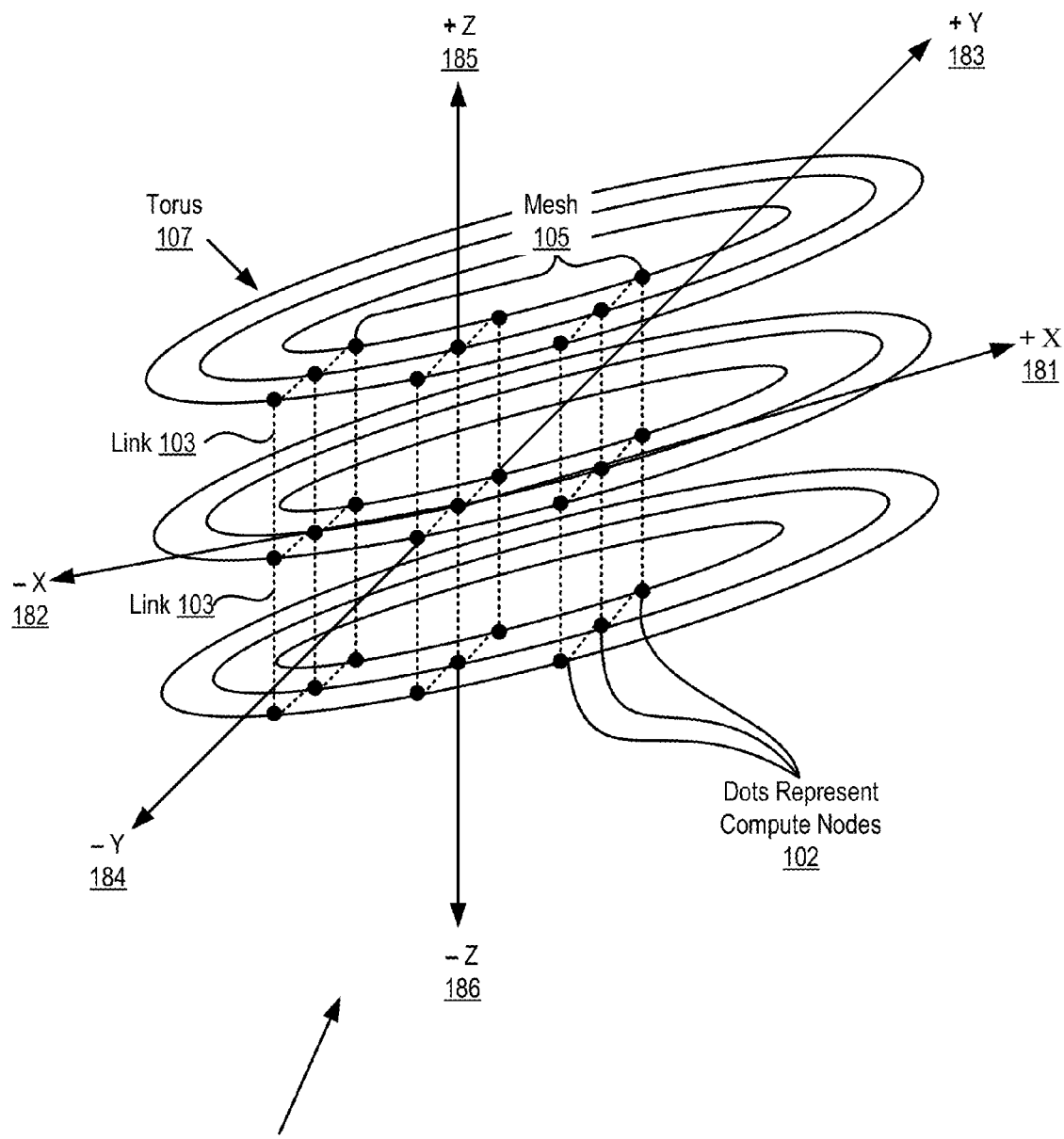
FIG. 4 sets forth a line drawing illustrating an example data communications network optimized for point-to-point operations useful in systems capable of processing posted receive commands according to embodiments of the present invention.

For further explanation, FIG. 4 sets forth a line drawing illustrating an example data communications network (108) optimized for point-to-point operations useful in systems capable of processing posted receive commands according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in processing posted receive commands in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in processing posted receive commands in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
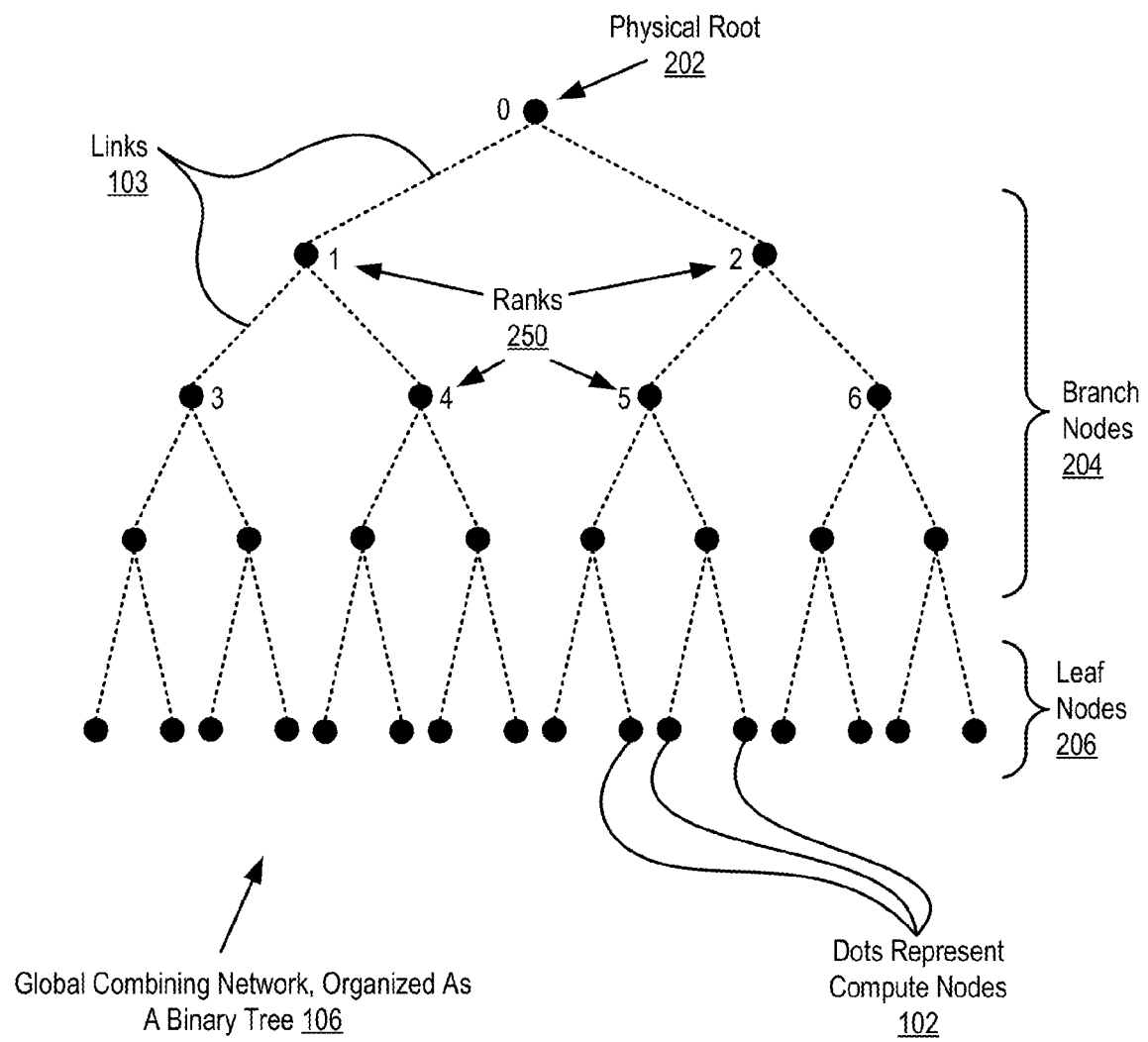
FIG. 5 sets forth a line drawing illustrating an example global combining network useful in systems capable of processing posted receive commands according to embodiments of the present invention.

For further explanation, FIG. 5 sets forth a line drawing illustrating an example global combining network (106) useful in systems capable of processing posted receive commands according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in processing posted receive commands in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
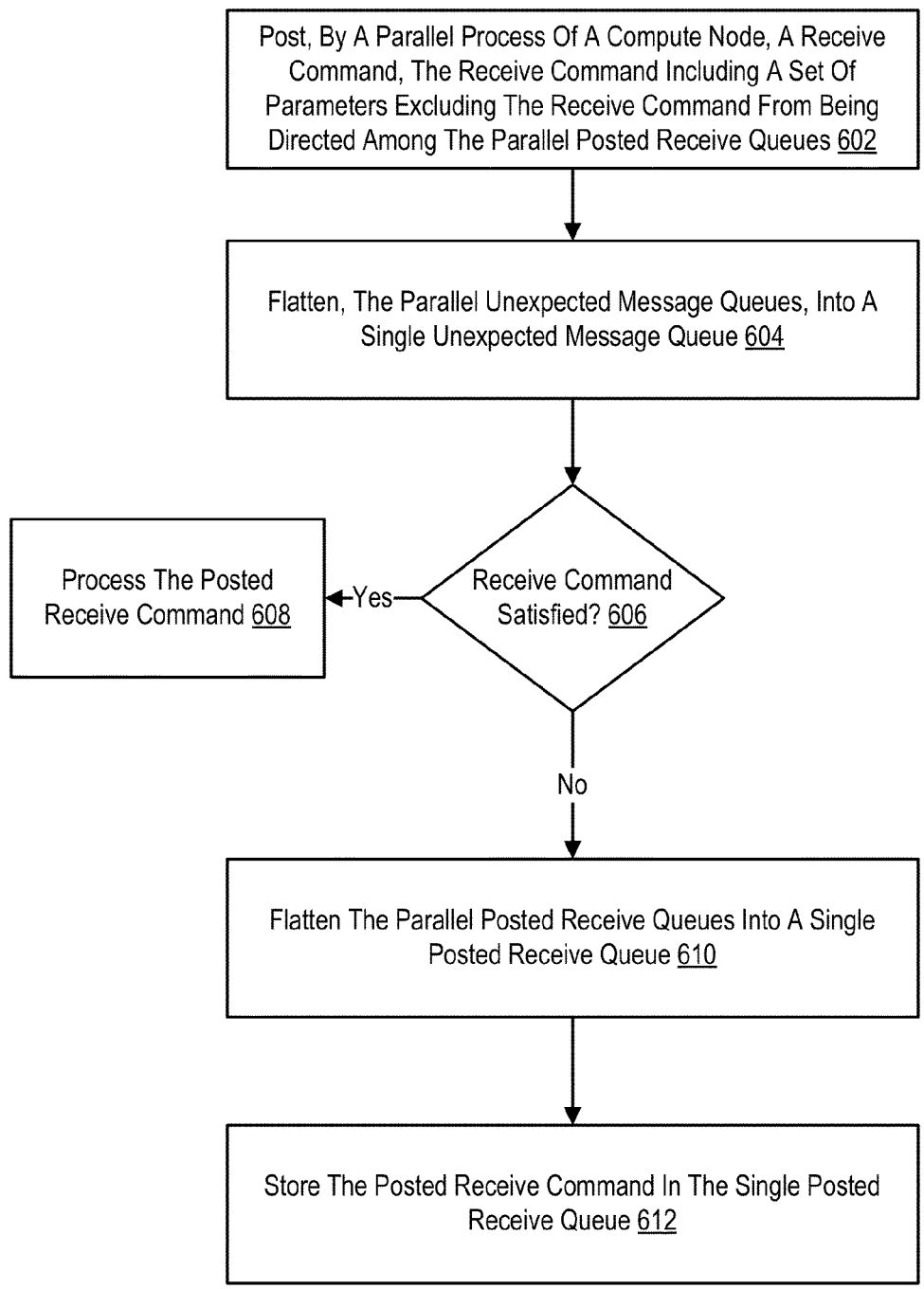
FIG. 6 sets forth a flow chart illustrating an example method for processing posted receive commands in a parallel computer according to embodiments of the present invention.

FIG. 6 sets forth a flow chart illustrating an example method for processing posted receive commands in a parallel computer according to embodiments of the present invention. The method of FIG. 6 may be carried out in a parallel computer similar to that depicted in the example of FIG. 1 that includes a plurality of compute nodes similar to that depicted in the example of FIG. 2.

Each compute node executes one or more parallel processes and includes a plurality of parallel posted receive queues and a plurality of parallel unexpected message queues. Posted receive commands are directed to a particular posted receive queue in dependence upon a set of message parameters (parameters specified in the receive command) and unexpected messages are directed to a particular unexpected message queue in dependence upon the set of message parameters (parameters which may be specified in the header of a message).

The method of FIG. 6 includes posting (602), by a parallel process of a compute node, a receive command. In the example of FIG. 6, the receive command includes a set of parameters that excludes the receive command from being directed among the parallel posted receive queues. In some cases, a parameter having a wildcard value, for example, may preclude a receive command from being directed to a particular parallel posted receive queue.

The method of FIG. 6 also includes flattening (604) the parallel unexpected message queues into a single unexpected message queue. Each element in each parallel unexpected message queue has a pointer to a next element in the parallel unexpected message queue. The last element of the parallel unexpected message queue has a null pointer. Flattening (604) the parallel unexpected message queues into a single unexpected message queue then may include setting, for each parallel message queue, iteratively beginning at a first unexpected message queue, the pointer of the last element of the parallel unexpected message queue to point to the first element of a next unexpected message queue. Consider, as an example, two parallel unexpected message queues. In such an example, flattening the queues into a single queue includes setting the pointer of the last element of one queue to point to a first element of the next queue.

The method of FIG. 6 also includes determining (606) whether the posted receive command is satisfied by an entry in the single unexpected message queue. Determining (606) whether the posted receive command is satisfied by an entry in the single unexpected message queue may include inspecting, by a parallel communications library (or other module carrying out the method of FIG. 6) a first element of the queue and determining whether the first element matches the message parameters specified in the receive command. If not, the parallel communications library moves to the next element of the queue through use of the pointer of the first element. The process repeats, moving through each element of the queue, until a match is discovered or the parallel communications library reaches the end of the queue.

If the posted receive command is satisfied by an entry in the single unexpected message queue, the method of FIG. 6 continues by processing (608) the posted receive command. Processing (608) the posted receive command may be carried out executing a call back to the process that posted the receive command indicating to the process that a message matching the parameters of the receive command is available. Such a call back may also include information pertaining to a present memory address of the message, a data size of the payload of the message, and other information as will occur to readers of skill in the art.

If the posted receive command is not satisfied by an entry in the single unexpected message queue: the method of FIG. 6 continues by flattening (610) the parallel posted receive queues into a single posted receive queue and storing (612) the posted receive command in the single posted receive queue. flattening (610) the parallel posted receive queues into a single posted receive queue may be carried out in a manner similar to that described above with respect to flattening (604) the parallel unexpected message queues—by setting the pointer of the last element of each parallel queue to point to the first element of the next parallel queue.

Figure 7:
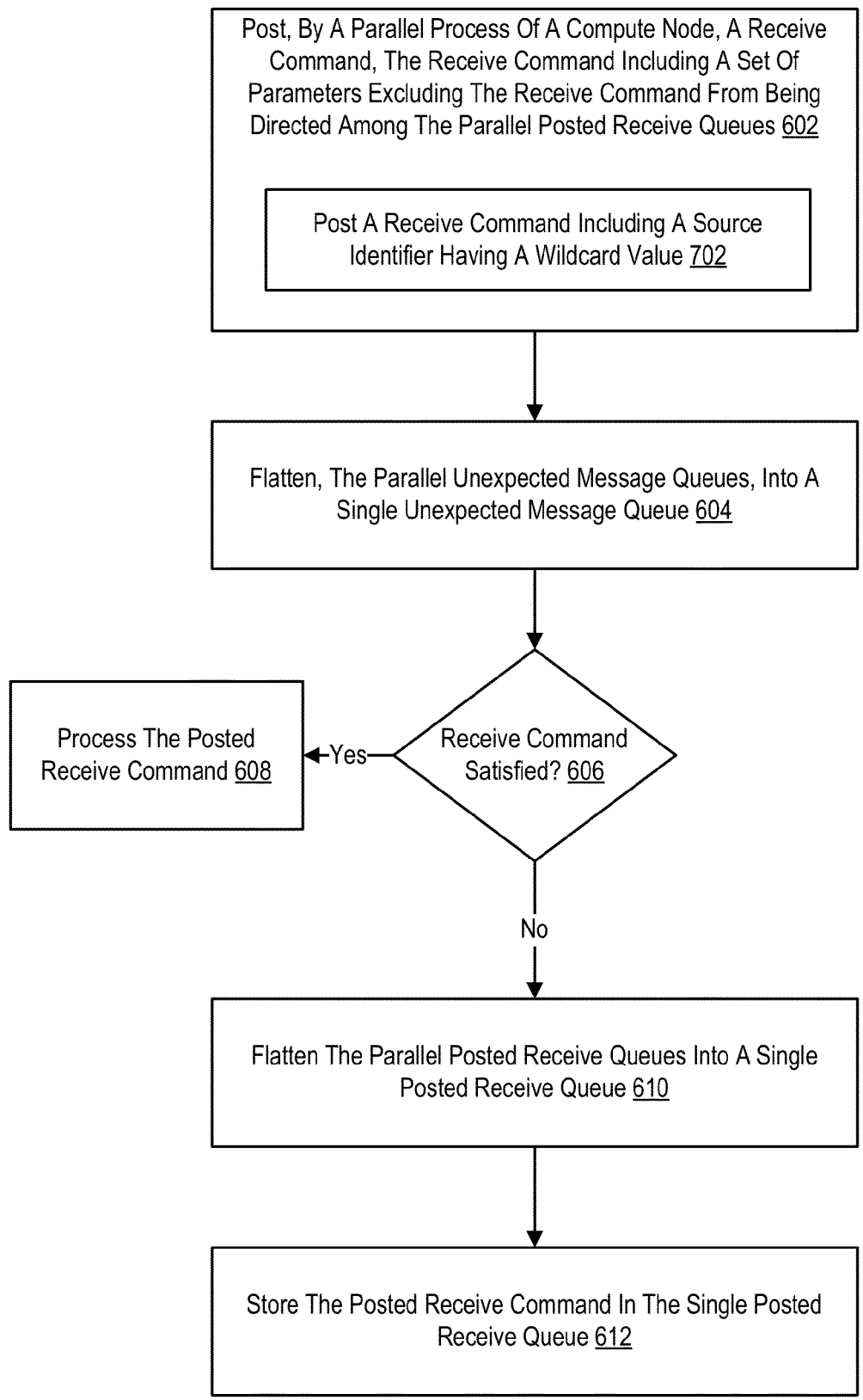
FIG. 7 sets forth a flow chart illustrating a further example method for processing posted receive commands in a parallel computer according to embodiments of the present invention.

FIG. 7 sets forth a flow chart illustrating a further example method for processing posted receive commands in a parallel computer according to embodiments of the present invention. FIG. 7 is similar to the method of FIG. 6 in that the method of FIG. 7 also includes: posting (602) a receive command that includes a set of parameters excluding the receive command from being directed among the parallel posted receive queues; flattening (604) the parallel unexpected message queues; determining whether the posted receive command is satisfied by an entry in the single unexpected message queue; processing the posted receive command if the command is satisfied by an entry in the single unexpected message queue; and, if the posted receive command is not satisfied by an entry in the single unexpected message queue: flattening the parallel posted receive queues into a single posted receive queue; and storing the posted receive command in the single posted receive queue.

The method of FIG. 7 differs from the method of FIG. 6, however, in that in the method of FIG. 7 each posted receive command is directed to a particular posted receive queue in dependence upon a hash of the parameters of the posted receive command and each unexpected message is directed to a particular upon a hash of the parameters of the unexpected message. In the method of FIG. 7, the parameters of each posted receive command and each message include a source identifier, a group identifier, and a predefined message tag.

Also in the method of FIG. 7 posting (602) a receive command, includes posting (702) a receive command including a source identifier having a wildcard value. A source identifier generally identifies a source of a message that satisfies the receive command. A parallel process may, for example, specify a particular rank in a communication as an integer value. In the example of FIG. 7, rather than specifying one particular node, the receive command may include a wildcard specifying any source identifier. For such a wildcard, generally a non-integer value—a hash cannot be taken.

Figure 8:
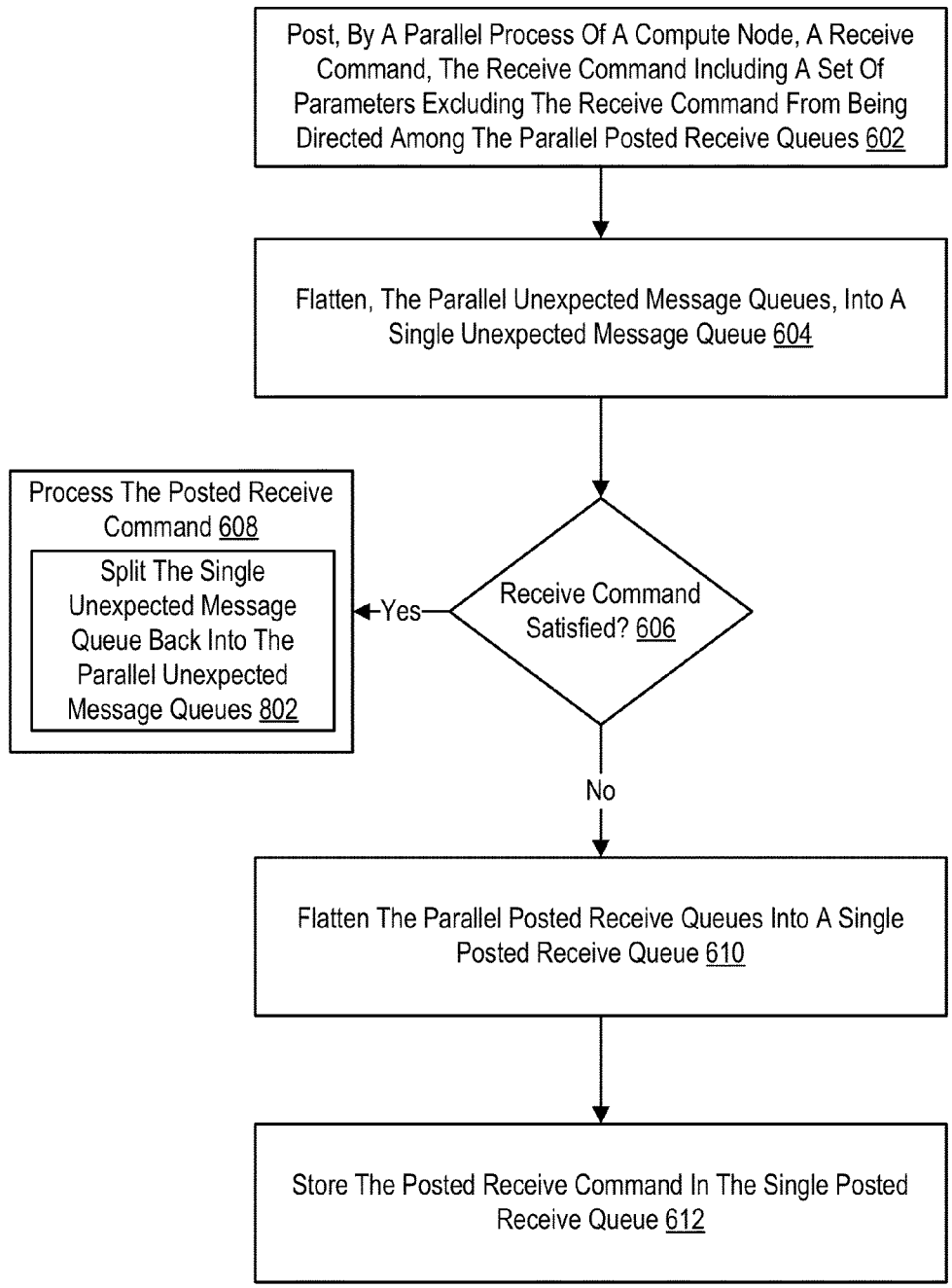
FIG. 8 sets forth a flow chart illustrating a further example method for processing posted receive commands in a parallel computer according to embodiments of the present invention.

FIG. 8 sets forth a flow chart illustrating a further example method for processing posted receive commands in a parallel computer according to embodiments of the present invention. FIG. 8 is similar to the method of FIG. 6 in that the method of FIG. 8 includes many of the same method steps. The method of FIG. 8 differs from the method of FIG. 6, however, in that in the method of FIG. 8, if the posted receive command is satisfied by an entry in the single unexpected message queue, processing (608) the posted receive command includes splitting (802) the single unexpected message queue back into the parallel unexpected message queues. Splitting (802) the single unexpected message queue back into the parallel unexpected message queues may be carried out in a reverse fashion from the flattening process described above. The pointer for each element in the single queue that was originally a last element of a parallel queue may be reassigned from pointing to a next element, to being a null value—pointing to no element.

Figure 9:
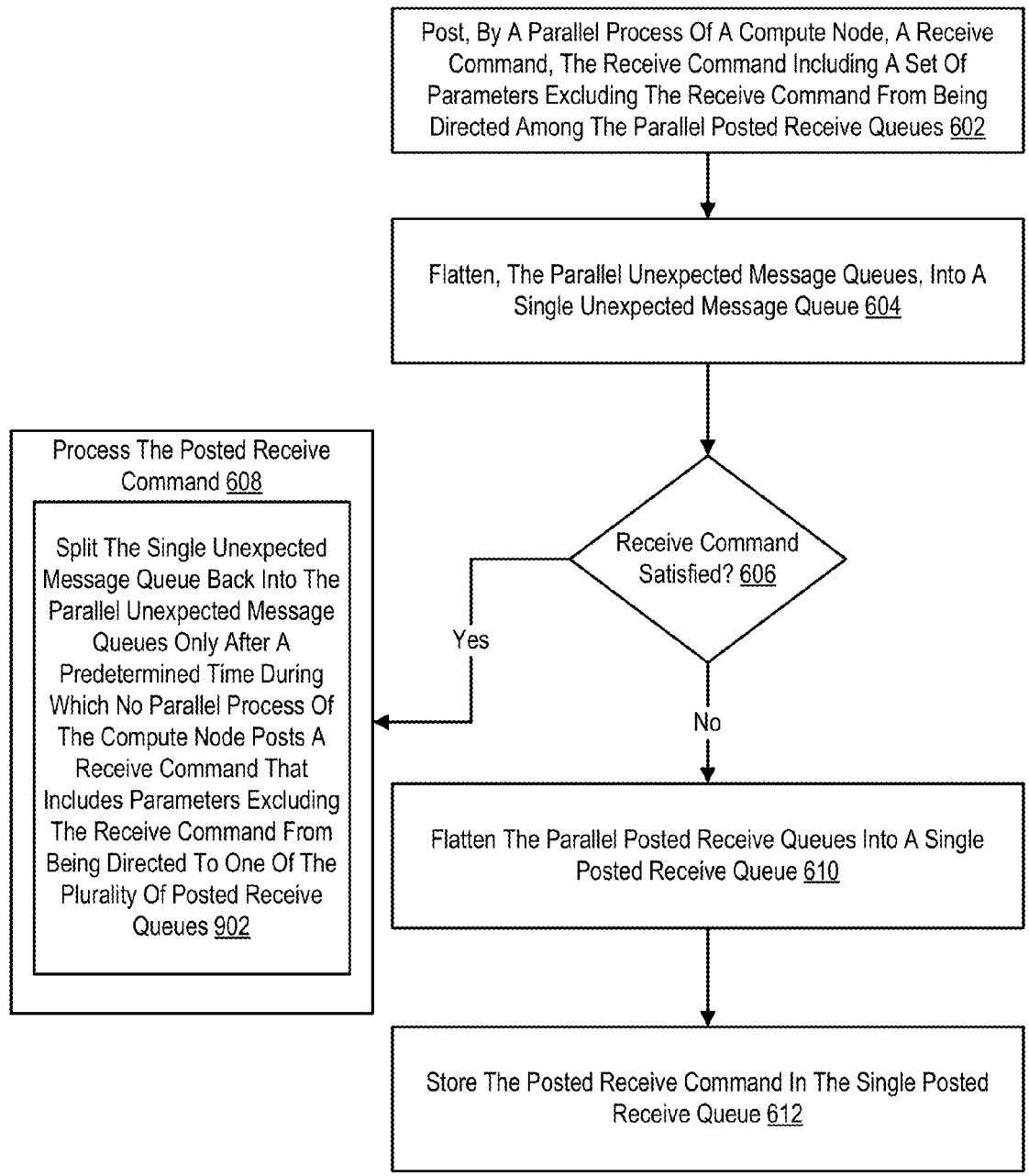
FIG. 9 sets forth a flow chart illustrating a further example method for processing posted receive commands in a parallel computer according to embodiments of the present invention.

FIG. 9 sets forth a flow chart illustrating a further example method for processing posted receive commands in a parallel computer according to embodiments of the present invention. FIG. 9 is similar to the method of FIG. 6 in that the method of FIG. 9 includes many of the same method steps. The method of FIG. 9 differs from the method of FIG. 6, however, in that in the method of FIG. 9, if the posted receive command is satisfied by an entry in the single unexpected message queue, processing (608) the posted receive command includes splitting (902) the single unexpected message queue back into the parallel unexpected message queues only after a predetermined time during which no parallel process of the compute node posts a receive command that includes parameters excluding the receive command from being directed to one of the plurality of posted receive queues. In some embodiments, a parallel process posting a receive command with a message parameter having wildcard value may also be configured to post a number of similar receive commands. Rather than flattening and splitting the queues upon each such receive command, the method of FIG. 9 provides a predefined period of time during which the flattened queue cannot be split, thus reducing the number of flattens and splits.

Figure 10:
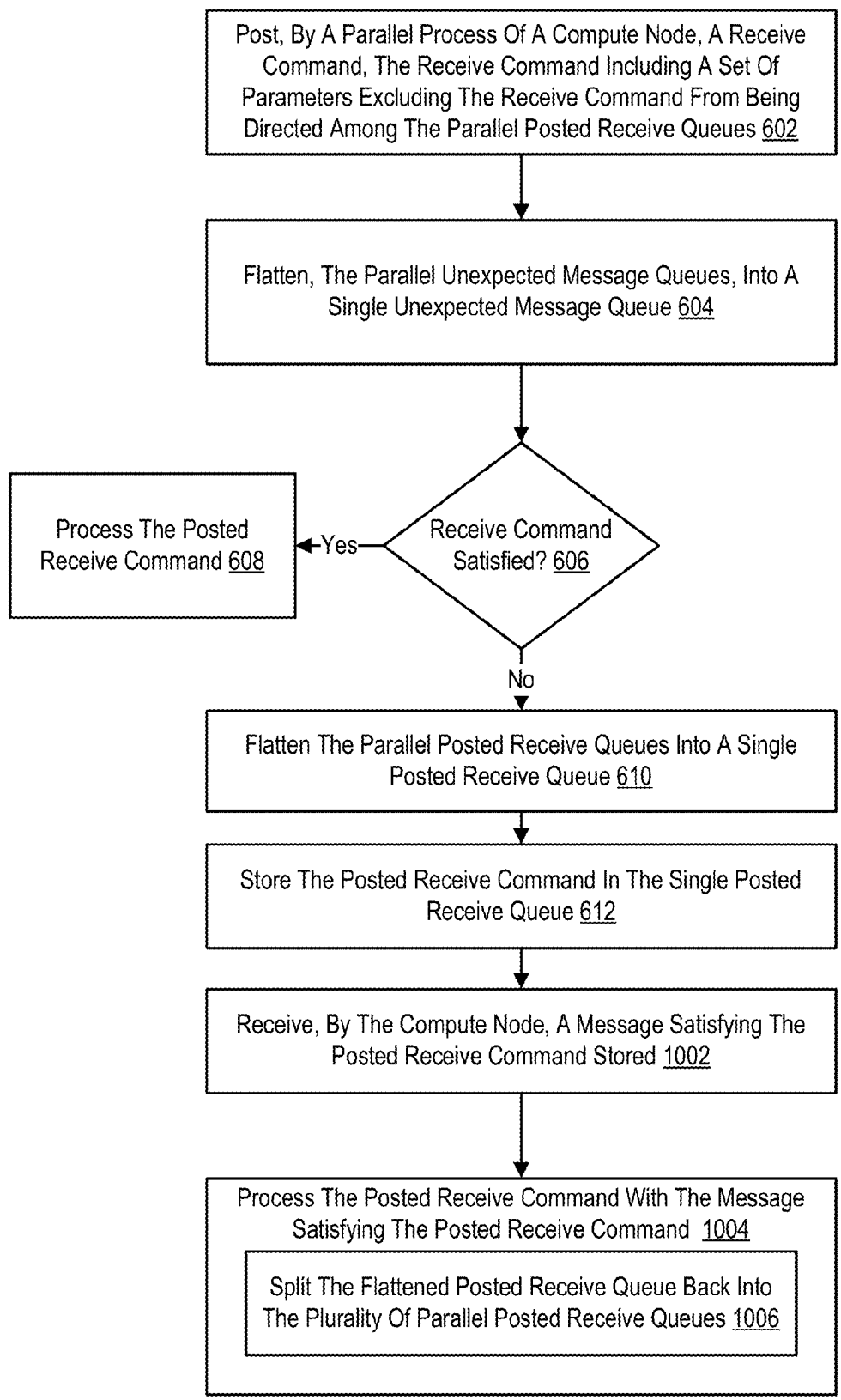
FIG. 10 sets forth a flow chart illustrating a further example method for processing posted receive commands in a parallel computer according to embodiments of the present invention.

FIG. 10 sets forth a flow chart illustrating a further example method for processing posted receive commands in a parallel computer according to embodiments of the present invention. FIG. 10 is similar to the method of FIG. 6 in that the method of FIG. 10 includes many of the same method steps.

The method of FIG. 10 differs from the method of FIG. 6, however, in that after storing (612) the posted receive command in the single posted receive queue, the method of FIG. 6 continues by receiving (1002), by the compute node, a message satisfying the posted receive command stored in the flattened posted receive queue.

The method of FIG. 10 also includes processing (1004) the posted receive command with the message satisfying the posted receive command. In the method of FIG. 10, processing (1004) the posted receive command with the message satisfying the posted receive command includes splitting (1006) the flattened posted receive queue back into the plurality of parallel posted receive queues. Splitting (1006) the flattened posted receive queue back into the plurality of parallel posted receive queues may be carried out by determining the hash of message parameters of the receive commands in the queue, using the hash to identify the separate parallel queues (where to split the single queue), and setting the pointer of the last element in each queue to a null value.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for processing posted receive commands in a parallel computer, the parallel computer comprising a plurality of compute nodes, the compute nodes coupled for data communications by a data communications network, each compute node executing one or more parallel processes, each compute node comprising a plurality of parallel posted receive queues and a plurality of parallel unexpected message queues, wherein posted receive commands are directed to a particular posted receive queue in dependence upon a set of message parameters, and unexpected messages are directed to a particular unexpected message queue in dependence upon the set of message parameters, the apparatus comprising a computer processor, a computer memory operatively coupled to the computer processor, the computer memory having disposed within it computer program instructions that, when executed by the computer processor, cause the apparatus to carry out the steps of:

posting, by a parallel process of a compute node, a receive command, the receive command including a set of parameters excluding the receive command from being directed among the parallel posted receive queues;

in response to receiving the receive command having the set of parameters excluding the receive command from being directed among the parallel posted receive queues:
flattening the parallel unexpected message queues into a single unexpected message queue;
determining whether the posted receive command is satisfied by an entry in the single unexpected message queue;
if the posted receive command is satisfied by an entry in the single unexpected message queue, processing the posted receive command;
if the posted receive command is not satisfied by an entry in the single unexpected message queue:
flattening the parallel posted receive queues into a single posted receive queue; and
storing the posted receive command in the single posted receive queue.

2. The apparatus of claim 1 wherein:
if the posted receive command is satisfied by an entry in the single unexpected message queue, processing the posted receive command further comprises splitting the single unexpected message queue back into the parallel unexpected message queues.

3. The apparatus of claim 1 wherein:
if the posted receive command is satisfied by an entry in the single unexpected message queue, processing the posted receive command further comprises splitting the single unexpected message queue back into the parallel unexpected message queues only after a predetermined time during which no parallel process of the compute node posts a receive command that includes parameters excluding the receive command from being directed to one of the plurality of posted receive queues.

4. The apparatus of claim 1 wherein:
each posted receive command is directed to a particular posted receive queue in dependence upon a hash of the parameters of the posted receive command;
each unexpected message is directed to a particular unexpected message queue in dependence upon a hash of the parameters of the unexpected message;
the parameters of each posted receive command and each message includes a source identifier and a context identifier; and
posting, by a parallel process of a compute node, a receive command, the receive command including a set of parameters excluding the receive command from being directed among the parallel posted receive queues further comprises posting a receive command including a source identifier having a wildcard value.

5. The apparatus of claim 1 wherein:
each element in each parallel unexpected message queue has a pointer to a next element in the parallel unexpected message queue, where a last element of the parallel unexpected message queue has a null pointer; and
flattening the parallel unexpected message queues into a single unexpected message queue further comprises:
setting, for each parallel message queue, iteratively beginning at a first unexpected message queue, the pointer of the last element of the parallel unexpected message queue to point to the first element of a next unexpected message queue.

6. The apparatus of claim 1, further comprising computer program instructions that, when executed by the computer processor, cause the apparatus to carry out the steps of:
after storing the posted receive command in the single posted receive queue, receiving, by the compute node, a message satisfying the posted receive command stored in the flattened posted receive queue; and
processing the posted receive command with the message satisfying the posted receive command including splitting the flattened posted receive queue back into the plurality of parallel posted receive queues.

7. A computer program product for processing posted receive commands in a parallel computer, the parallel computer comprising a plurality of compute nodes, the compute nodes coupled for data communications by a data communications network, each compute node executing one or more parallel processes, each compute node comprising a plurality of parallel posted receive queues and a plurality of parallel unexpected message queues, wherein posted receive commands are directed to a particular posted receive queue in dependence upon a set of message parameters, and unexpected messages are directed to a particular unexpected message queue in dependence upon the set of message parameters, the computer program product disposed upon a computer readable medium, wherein the computer readable medium is not a signal, the computer program product comprising computer program instructions that, when executed, cause a computer to carry out the steps of:

posting, by a parallel process of a compute node, a receive command, the receive command including a set of parameters excluding the receive command from being directed among the parallel posted receive queues;

in response to receiving the receive command having the set of parameters excluding the receive command from being directed among the parallel posted receive queues:

flattening the parallel unexpected message queues into a single unexpected message queue;

determining whether the posted receive command is satisfied by an entry in the single unexpected message queue;

if the posted receive command is satisfied by an entry in the single unexpected message queue, processing the posted receive command;

if the posted receive command is not satisfied by an entry in the single unexpected message queue:

flattening the parallel posted receive queues into a single posted receive queue; and storing the posted receive command in the single posted receive queue.

8. The computer program product of claim 7 wherein:

if the posted receive command is satisfied by an entry in the single unexpected message queue, processing the posted receive command further comprises splitting the single unexpected message queue back into the parallel unexpected message queues.

9. The computer program product of claim 7 wherein:

if the posted receive command is satisfied by an entry in the single unexpected message queue, processing the posted receive command further comprises splitting the single unexpected message queue back into the parallel unexpected message queues only after a predetermined time during which no parallel process of the compute node posts a receive command that includes parameters excluding the receive command from being directed to one of the plurality of posted receive queues.

10. The computer program product of claim 7 wherein:

each posted receive command is directed to a particular posted receive queue in dependence upon a hash of the parameters of the posted receive command;

each unexpected message is directed to a particular unexpected message queue in dependence upon a hash of the parameters of the unexpected message;

the parameters of each posted receive command and each message includes a source identifier and a context identifier; and posting, by a parallel process of a compute node, a receive command, the receive command including a set of parameters excluding the receive command from being directed among the parallel posted receive queues further comprises posting a receive command including a source identifier having a wildcard value.

11. The computer program product of claim 7 wherein:

each element in each parallel unexpected message queue has a pointer to a next element in the parallel unexpected message queue, where a last element of the parallel unexpected message queue has a null pointer; and flattening the parallel unexpected message queues into a single unexpected message queue further comprises: setting, for each parallel message queue, iteratively beginning at a first unexpected message queue, the pointer of the last element of the parallel unexpected message queue to point to the first element of a next unexpected message queue.

12. The computer program product of claim 7, further comprising computer program instructions that, when executed, cause a computer to carry out the steps of:

after storing the posted receive command in the single posted receive queue, receiving, by the compute node, a message satisfying the posted receive command stored in the flattened posted receive queue; and processing the posted receive command with the message satisfying the posted receive command including splitting the flattened posted receive queue back into the plurality of parallel posted receive queues.

* * * * *